(12) United States Patent
White et al.

(10) Patent No.: US 8,910,232 B2
(45) Date of Patent: Dec. 9, 2014

(54) SYSTEM AND METHOD OF ANALYZING INTERNET PROTOCOL TELEVISION CONTENT FOR CLOSED-CAPTIONING INFORMATION

(75) Inventors: Scott White, Austin, TX (US); James L. Cansler, Cedar Park, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1115 days.

(21) Appl. No.: 12/558,991

(22) Filed: Sep. 14, 2009

(65) Prior Publication Data

US 2011/0067079 A1 Mar. 17, 2011

(51) Int. Cl.
| | |
|---|---|
| *H04N 7/173* | (2011.01) |
| *G06F 17/30* | (2006.01) |
| *G10L 15/26* | (2006.01) |
| *H04N 21/442* | (2011.01) |
| *H04N 21/439* | (2011.01) |
| *H04N 21/482* | (2011.01) |
| *H04N 5/76* | (2006.01) |
| *H04N 21/433* | (2011.01) |
| *H04N 21/488* | (2011.01) |
| *H04N 21/45* | (2011.01) |

(52) U.S. Cl.
CPC ............ *G10L 15/265* (2013.01); *H04N 21/442* (2013.01); *H04N 21/4394* (2013.01); *H04N 21/4826* (2013.01); *H04N 5/76* (2013.01); *H04N 21/4334* (2013.01); *H04N 21/4884* (2013.01); *H04N 21/4532* (2013.01)
USPC ............ 725/133; 725/110; 707/726; 707/734

(58) Field of Classification Search
CPC .......... H04N 21/4334; H04N 21/4394; H04N 21/442; H04N 21/4532; H04N 21/4826
See application file for complete search history.

(56) References Cited

U.S. PATENT DOCUMENTS

| | | |
|---|---|---|
| 2001/0033736 A1 | 10/2001 | Yap et al. |
| 2003/0014753 A1 | 1/2003 | Beach et al. |
| 2005/0097607 A1* | 5/2005 | Kummer et al. ............... 725/58 |
| 2005/0198006 A1 | 9/2005 | Boicey et al. |
| 2006/0143653 A1 | 6/2006 | Suh |
| 2007/0053513 A1 | 3/2007 | Hoffberg et al. |
| 2007/0282818 A1 | 12/2007 | Lynn et al. |
| 2008/0172697 A1 | 7/2008 | Hanashima et al. |
| 2008/0313146 A1 | 12/2008 | Wong et al. |
| 2009/0022472 A1 | 1/2009 | Bronstein et al. |

(Continued)

FOREIGN PATENT DOCUMENTS

WO     WO 01/37465     * 5/2001

*Primary Examiner* — Nathan Flynn
*Assistant Examiner* — James R Marandi
(74) *Attorney, Agent, or Firm* — Guntin & Gust, PLC; Joseph Hrutka (57) ABSTRACT

An Internet Protocol television (IPTV) system includes a selector module that selects a content item and sends a stream of the content item to a set-top box. The set-top box analyzes content information associated with the content item using a speech interpretation algorithm or a text interpretation algorithm to create an index of the content information and determines to record the content item based upon the index of the content information. A method includes sending a content item from an IPTV network to a set-top box, directing the set-top box to analyze content information associated with the content item using a speech interpretation algorithm or a text interpretation algorithm, and directing the set-top box to record the content item based upon the analysis of the content information.

20 Claims, 5 Drawing Sheets

(56) References Cited

U.S. PATENT DOCUMENTS

| | | |
|---|---|---|
| 2009/0049481 A1 | 2/2009 | Fellenstein et al. |
| 2009/0100454 A1* | 4/2009 | Weber .............................. 725/9 |
| 2009/0138326 A1* | 5/2009 | Shi .................................. 705/10 |
| 2009/0165036 A1* | 6/2009 | Berry .............................. 725/32 |
| 2009/0187951 A1 | 7/2009 | McCarthy et al. |

* cited by examiner

SYSTEM AND METHOD OF ANALYZING INTERNET PROTOCOL TELEVISION CONTENT FOR CLOSED-CAPTIONING INFORMATION

FIELD OF THE DISCLOSURE

The present disclosure generally relates to an Internet protocol television system, and more particularly relates to analyzing content on an Internet protocol television system.

BACKGROUND

An Internet protocol television (IPTV) service provider can transmit an IPTV signal to a user of the IPTV system via a central office, a serving area interface, and a residential gateway. The IPTV service provider can offer the user a variety of different content and services. For example, the IPTV service provider can supply users with real-time television programs that are typically available for the users to watch only at a specific date and time. The IPTV service providers can also offer the users on-demand movies that are available for an extended amount of time and that are provided to the users upon request of the on-demand movie. The user can also record audio or video content for storage in a digital format on the user's set-top box or on a data server on the IPTV system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
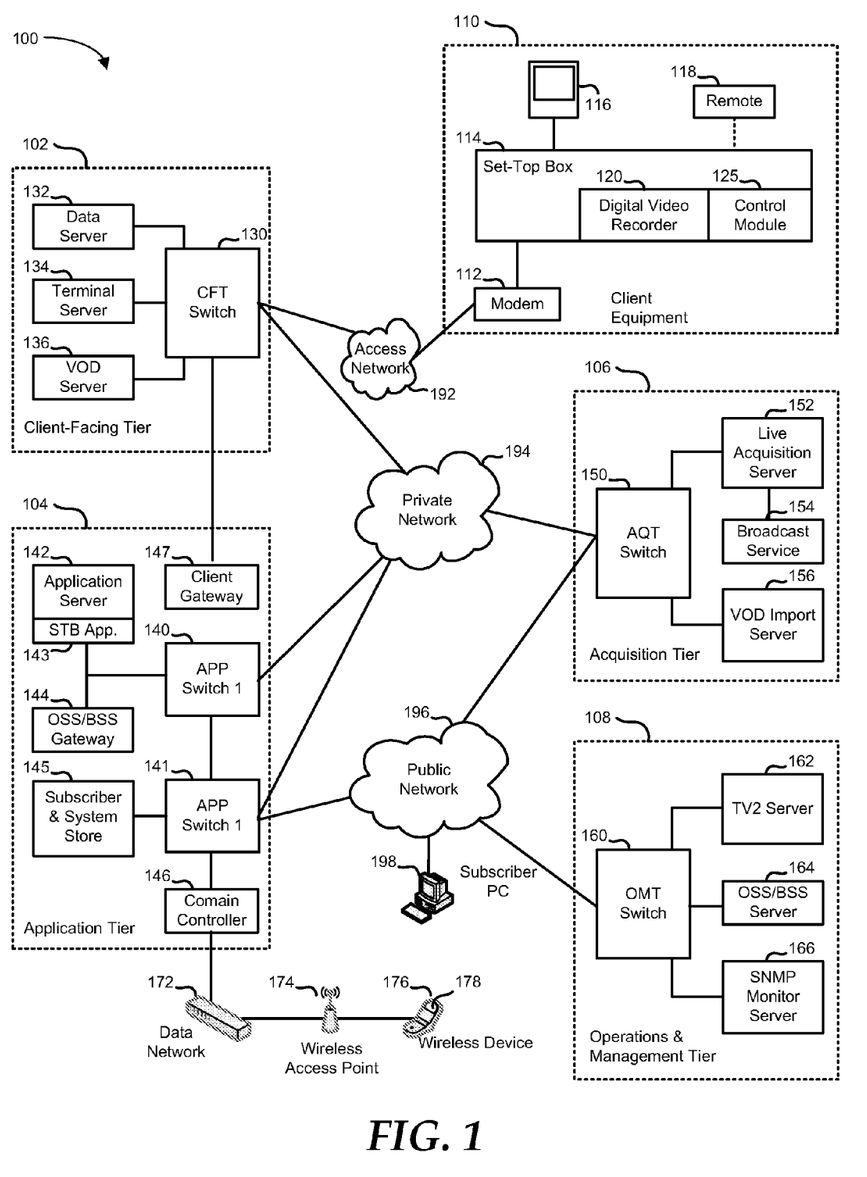
FIG. 1 is a block diagram illustrating an embodiment of an IPTV network.

FIG. 1 shows an embodiment of an IPTV system 100 including a client facing (CF) tier 102, an application tier 104, an acquisition tier 106, an operations and management (OM) tier 108, and one or more sets of client equipment 110. Client equipment 110 is typically located at the home or business premises of a subscriber to the IPTV system 100. IPTV system 100 includes an access network 192, a private network 194, and a public network 196. Each tier 102, 104, 106, and 108 is coupled to one or more of access network 192, private network 194, and public network 196. In an embodiment, CF tier 102 is coupled to access network 192 and to private network 194, application tier 104 is coupled to private network 194 and to public network 196, acquisition tier 106 is coupled to private network 194 and to public network 196, and OM tier 108 is coupled to public network 196. Client equipment 110 is coupled to access network 192.

Networks 192, 194 and 196 communicate information between tiers 102, 104, 106, and 108, and client equipment 110. Access network 192 communicates information between CF tier 102 and client equipment 110. Private network 194 communicates information between CF tier 102 and application tier 104, between application tier 104 and acquisition tier 106, and between acquisition tier 106 and CF tier 102. Public network 196 communicates information between application tier 104 and acquisition tier 106, between acquisition tier 106 and OM tier 108, and between OM tier 108 and application tier 104. Information is also communicated directly between CF tier 102 and application tier 104, as described below. The information communicated between tiers 102, 104, 106, and 108, and client equipment 110 includes encoded television programs, audio files, data files, commands, procedures, other information, or any combination thereof.

CF tier 102 communicates with multiple sets of client equipment 110 over a wide geographic area, such as a regional area, a metropolitan area, a viewing area, or any other suitable geographic area that is supported by access network 192. Client equipment 110 includes a modem 112, a set-top box 114, a display device 116, and a remote control 118. The set-top box 114 includes a digital video recorder (DVR) 120 and a control module 125. Modem 112 is coupled to access network 192, and translates information from a form suitable for transmission over access network 192 to a form suitable for use by set-top box 114, and vice versa. In a non-limiting example, modem 112 is coupled to access network 192 via fiber-optic cables, a digital subscriber line (DSL), another network fabric, or any combination thereof.

The information that CF tier 102 communicates to modem 112 is sent to set-top box 114, which processes the information into a form suitable for display by display device 116 or for recording by DVR 120. Set-top box 114 receives digitally encoded content from CF tier 102 for display on display device 116, or for recording by DVR 120. Set-top box 114 can also receive data from CF tier 102, and render or display the data on display device 116. Further, set-top box 114 can send data to CF tier 102. Such data can include service requests, or commands from the subscriber, received by set-top box 112 via remote control 118. In this way, the subscriber can request services or information or respond to a request for information from IPTV system 100. Control module 125 includes instructions that are executable by set-top box 114 to control the data flow between the subscriber and IPTV system 100. Control module 125 can include an IPTV software platform such as Microsoft® TV IPTV Edition.

Control module 125 can facilitate data communication between set-top box 114 and IPTV system 100. For example, control module 125 can include a procedure whereby set-top box 114 receives a request to record content on DVR 120, or sends a status to IPTV system 100 that the content has been recorded. Likewise, control module 125 can include a procedure whereby the subscriber can interact with IPTV system 100 to receive and execute a viewing preference that the subscriber has created in IPTV system 100. Such preferences can be created via remote control 118, or through a subscriber account that is accessible through public network 196, such as through a subscriber's personal computer 198. A non-limiting example of remote control 118 includes a hand-held controller device, a game controller device, a keyboard/mouse device, another control device, or any combination thereof.

CF tier 102 includes a client-facing tier (CFT) switch 130, a data server 132, a terminal server 134, and a video-on-demand (VOD) server 136. CFT switch 130 manages communication with client equipment 110 through access network 192 and with application tier 104 and acquisition tier 106 through private network 194. CFT switch 130 is coupled to data server 132 that stores data transmitted in response to subscriber requests. CFT switch 130 is also coupled to terminal server 134 that provides terminal devices, such as a game application server, or other devices with a common connection point to private network 194. CFT switch 130 is also coupled to VOD server 136.

Application tier 104 includes application tier (APP) switches 140 and 141, an application server 142, an operation systems and support/billing systems and support (OSS/BSS) server 144, a subscriber and system store 145, a domain controller 146, and a client gateway 147. APP switches 140 and 141 manage communication with CF tier 102 and acquisition tier 106 through private network 194. APP switch 141 also manages communication with acquisition tier 106 and OM tier 108 through public network 196. APP switch 140 is coupled to APP switch 141. APP switch 140 is also coupled to application server 142 and to OSS/BSS gateway 144. Application server 142 provides applications to set-top box 114 through a set-top box application 143, so that set-top box 114 can provide functions such as recording and displaying content, messaging, and processing of IPTV data and VOD material. OSS/BSS gateway 144 includes operation systems and support (OSS) data, and billing systems and support (BSS) data.

APP switch 141 is coupled to domain controller 146 and to subscriber and system store 145. Domain controller 146 provides web access, for example, to subscribers via public network 196. Subscriber and system store 145 includes account information that is associated with subscribers who access IPTV system 100 via private network 194 or public network 196. Application tier 104 also communicates data directly to CF tier 102 through client gateway 147. In this embodiment, client gateway 147 is coupled directly to CFT switch 130.

Client gateway 147 provides subscriber access to private network 194 and tiers coupled thereto. In particular, set-top box 114 accesses IPTV system 100 via access network 192 using information received from client gateway 147. Access network 192 provides security for private network 194. Client equipment 110 accesses client gateway 147 via access network 192, and client gateway 147 allows client equipment 110 to access private network 194 once client equipment 110 is authenticated or verified. Similarly, client gateway 147 prevents unauthorized client equipment (not illustrated), such as hacker computers or stolen set-top box devices, from accessing private network 194 by denying access to these devices beyond access network 192.

For example, when set-top box device 114 accesses IPTV system 100 via access network 192, client gateway 147 verifies subscriber information by communicating with subscriber and system store 145 via private network 194, APP switch 140, and APP switch 141. Further, client gateway 147 verifies billing information and status by communicating with OSS/BSS gateway 144 via private network 194 and APP switch 140. OSS/BSS gateway 144 transmits a query across APP switch 140, to APP switch 141, and APP switch 141 communicates the query across public network 196 to an OSS/BSS server 164 (described below). After the client gateway 147 confirms subscriber and/or billing information, client gateway 147 allows set-top box device 114 access to IPTV system 100 content and VOD server 136 content. If client gateway 147 cannot verify subscriber information for set-top box 114, such as when set-top box 114 is connected to a different twisted pair, or when set-top box 114 is stolen, client gateway 147 denies transmissions to and from set-top box device 114 beyond access network 192.

Domain controller 146 communicates with public network 196 via APP switch 141. Domain controller 146 includes a web portal that allows a subscriber to access IPTV system 100 using a personal computer 198. Domain controller 146 also communicates with a data network 172 that is connected to a wireless access point 174. Wireless access point 174 communicates with a subscriber's wireless device 176 to provide wireless access to IPTV system 100. A non-limiting example of a wireless device 176 includes a cellular telephone, a personal digital assistant, a mobile e-mail device, a portable digital video device, another wireless device, or any combination thereof. Wireless device 176 includes a display device 178 for displaying information from IPTV system 100. Display device 178 includes a text display, a picture display, a video display or any combination thereof.

Acquisition tier 106 includes an acquisition tier (AQT) switch 150, a live acquisition server 152, a broadcast service 154, and a video-on-demand importer server 156. AQT switch 150 manages communication with CF tier 104 and application tier 104 through private network 194, and with application tier 104 and OM tier 108 through public network 196. AQT switch 150 is coupled to live acquisition server 152, and video-on-demand importer server 156. Live acquisition server 152 acquires television content from broadcast service 154. Live acquisition server 152 sends the television content to AQT switch 150 for transmission to CF tier 102 via private network 194. The television content is further encoded at data server 132, and sent to client equipment 110 via access network 192. Set-top box 114 receives the television content from modem 112, decodes the television content, and transmits the information to display device 116 according to commands from remote control device 120.

Additionally, VOD importer server 156 receives content from one or more video-on-demand sources that are outside IPTV system 100, such as movie studios and programmers of non-live content. VOD importer server 156 transmits the video-on-demand content to AQT switch 150, and AQT switch 150 communicates the material to CFT switch 130 via private network 194. The video-on-demand content is stored on VOD server 136. When a subscriber issues a request for VOD content to set-top box 114 through remote control 118, the request is transmitted over access network 192 to VOD server 136 via CFT switch 130. Upon receiving such a request, VOD server 136 retrieves the requested VOD content and transmits the content to set-top box or 114 across access network 192 via CFT switch 130.

OM tier 108 includes an OM tier (OMT) switch 160, a TV2 server 162, the OSS/BSS server 164, and a simple network management protocol (SNMP) monitor server 166. OMT switch 160 manages the communication between OM tier 108 and public network 196. OMT switch 160 is coupled to TV2 server 162, OSS/BSS server 164, and SNMP monitor server 166 that monitors network devices. TV2 server 162 receives television content from live acquisition server 152, or video-on-demand content from VOD importer server 156 through public network 196. The television and video-on-demand content is sent by TV2 server 162 to OMT switch 160 and forwarded to a subscriber of IPTV system 100 who accesses public network 196 through personal computer 198.

Figure 2:
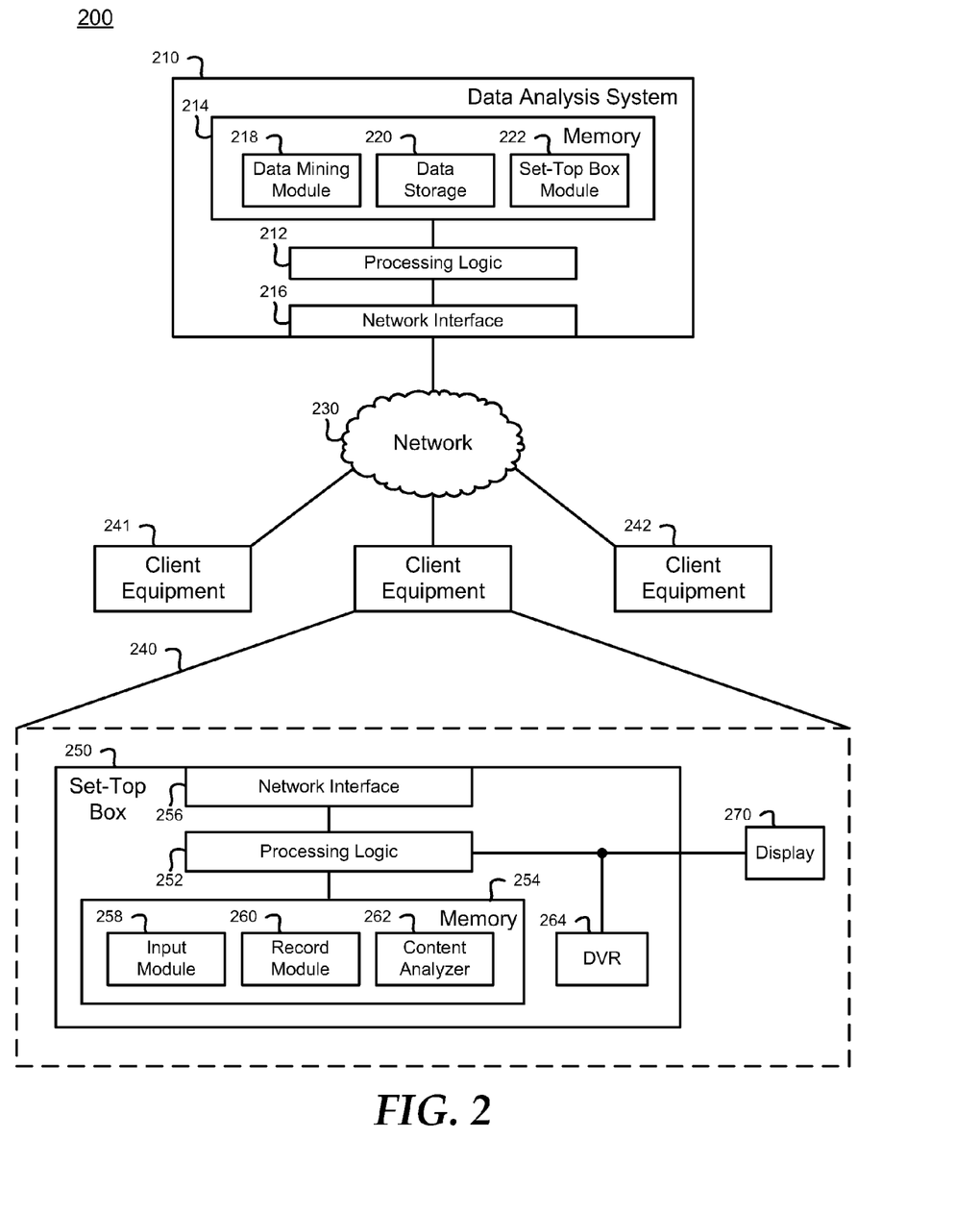
FIG. 2 is a block diagram of another embodiment of an IPTV network, including a data analysis system.

FIG. 2 illustrates an embodiment of a data analysis system that can proactively direct multiple set-top boxes to analyze various content. The set-top boxes can analyze streaming content in real time, or the content can be recorded using unused storage space on the set-top boxes' DVRs for later analysis. The results of the analysis can then be returned to the data analysis system. For example, a movie database system can include catalogs of content such as movies and television shows, and can provide cross-reference information regarding actors, directors, themes, titles, locations, genres, or other information related to the content. The movie database system can send content to underutilized set-top boxes and direct the set-top boxes to analyze the content to find a list of search terms or to otherwise index the content. The movie database system can also receive the results of the analysis and incorporate the results into the catalog. The data analysis system can also include a recommendation system (described below), that makes recommendations to one or more users' set-top boxes, based upon the results. A non-limiting example of content includes television programming, movies, VOD content, music, graphic presentations, other forms of content, or a combination thereof.

An IPTV system 200 similar to IPTV system 100 includes a back-end data analysis system 210 that communicates with client equipment 240, 241, and 242 via a network 230. Data analysis system 210 includes processing logic 212, a memory 214, and a network interface 216. Memory 214 is accessible to processing logic 212. Network interface 216 is adapted to facilitate communication between data analysis system 210 and network 230. Memory 214 includes a selector module such as a data mining module 218, a data storage module 220, and a set-top box module 222. Modules 218, 220, and 222 include computer instructions that are readable and executable by processing logic 212 to implement various functions of data analysis system 210. A non-limiting example of modules 218, 220, and 222 includes different aspects of one or more software applications, operating systems, other computer programs, or a combination thereof. In another embodiment (not illustrated), memory 214, and modules 218, 220, and 222 are implemented as hardware logic or a combination of hardware logic and computer instructions. Client equipment 240, 241, and 242 can include devices of different types, and can communicate with different types of networks including the Internet, television access networks, such as cable, satellite and IPTV access network, cellular networks, Wi-Fi networks, other wireless networks, or a combination thereof.

Data mining module 218 directs data analysis activities in IPTV system 200. Thus, data mining module 218 creates a catalog of content items that have already been analyzed, generates rules for gathering information from a content item that has yet to be analyzed, and selects content items for analysis and what rules to apply in the analysis. A content item can include content information and metadata information. Content information can include audio information and video information associated with a television program, a movie, a music file, another multimedia file, or a combination thereof. Metadata information can include information that characterizes the content information. For example, metadata information can include electronic programming guide (EPG) information, other information provided with the content item and that characterizes the content item, or a combination thereof. Data mining module 218 directs content analyzer module 262 to analyze a content item as described below. Data mining module 218 can direct content analyzer module 262 to analyze the content information of a content item, the metadata information of the content item, or both the content information and the metadata information, as described below.

In a particular example, a movie database system can determine to find in-depth information on a popular actor, select television programming created in the timeframe preceding the actor's popularity, and search credits information in the television programming to determine if the actor had minor roles in any of the television programming or otherwise index the television programming according to the actor's participation in the television programming. For example, credits information can include information displayed at the beginning and the end of the content item, such as the actors appearing in the content item, production information related to the content item, Internet addresses for additional information related to the content item, other information, or a combination thereof. Data mining module 218 also generates search terms to search for in the content items and establishes indexing criteria for the content item. For example, a search term may include an identification of a person, place, or thing to search for in content items, a correlation between particular persons, places, things, or combination thereof, a calculation based upon such an identification or correlation, another search terms, or a combination thereof. An example of an indexing criteria includes indexing by program titles, actor names, director names, production company and producer names, production crew names and positions, production locations and dates, other criteria, or a combination thereof.

Data storage module 220 stores content items that are in the process of being analyzed for a particular search term or indexing criteria. For example, a content item can be stored in data storage module 220 in anticipation of being analyzed for a particular search term or indexing criteria. Data storage module 220 also stores the results of mining operations on content items. For example, data storage module 220 can include a catalog of content items that include a particular actor or are produced by a particular director.

Set-top box module 222 sends and receives data from set-top boxes in client equipment 240, 241, and 242. For example, set-top box module 222 can direct set-top boxes, as described below, in client equipment 240, 241, and 242 to record and display content items, provide messaging services, process IPTV data and VOD material. Set-top box module 222 also receives requests from the set-top boxes for specific content items to be sent to client equipment 240, 241, and 242 at the request of a user. Further, set-top box module 222 determines if a DVR on a particular client equipment 240, 241, or 242 has unused content storage space or content storage space that is reserved for the use of data analysis system 210.

Client equipment 240 includes a set-top box 250 and a display device 270. Client equipment 240 communicates with IPTV system 200 via network 230. Set-top box 250 includes processing logic 252, a memory 254, a network interface 256, and a DVR 264. Memory 254 is accessible to processing logic 252. Network interface 256 is adapted to facilitate communication between client equipment 240 and network 230.

Memory 254 includes an input module 258, a record module 260, and a content analyzer module 262. Modules 258, 260, and 262 can be implemented as computer instructions that are readable and executable by processing logic 252, as hardware logic, or as a combination thereof.

Input module 258 receives and processes inputs from a user or from set-top box module 222. For example, input module 258 can receive an input corresponding to a content item search or indexing function, such as an input requesting recurrent searching and specifying one or more content item search terms or indexing criteria. In another example, input module 222 can receive an input specifying one or more changes in content item search terms or indexing criteria, an input indicating a request to discontinue recurrent searching or indexing, an input indicating that content item search terms or indexing criteria are to be deleted, or any combination thereof.

Further, input module 258 receives data from set-top box module 222 indicating that set-top box 250 is to record one or more content items on DVR 264. Thus, for example, record module 260 can record the content items on DVR 264 or instruct an external DVR (not illustrated) to record the content items. In another example, record module 260 can send the content items to display device 270.

Content analyzer module 262 analyzes a content item received by set-top box 250. For example, content analyzer module 262 can analyze a stream of the content item in real time as it is received by set-top box 250, analyze the content item after the content item has been recorded on DVR 264, or a combination thereof. Content analyzer module 262 also performs a variety of analysis functions on the content item. For example, content analyzer module 262 can analyze metadata information, content information, or both, associated with the content item. Content analyzer module 262 can analyze an audio track of the content information using a speech-to-text algorithm, analyze a closed captioning track or a video track of the content information using a screen-to-text algorithm, or a combination thereof. In a further example, a video track can be analyzed to gather credits information using a screen-to-text algorithm.

In the illustrated embodiment, data mining module 218 determines that a content item is to be analyzed and directs set-top box module 222 to determine if client equipment 240, 241, or 242 is available to analyze the content item. For example, set-top box module 222 can send a query to set-top box 250. There, input module 258 can determine if DVR 264 has available storage space and if content analyzer module 262 is available to analyze content items. If DVR 264 has available storage space and content analyzer module 262 is available to analyze content items, then input module 258 can respond to the query from set-top box module 222, indicating that set-top box 250 is available to analyze the content item.

Further, data mining module 218 directs set-top box module 222 to initiate content analysis in client equipment 240, 241, or 242. For example, set-top box module 222 can direct set-top box 250 to analyze a content item. Set-top box 250 can then perform a real time analysis on a stream of the content item, or record the content item on DVR 264 for later analysis, as described above. If the content item is recorded on DVR 246, then set-top box module 222 can direct set-top box 250 to erase the content item from DVR 246 when the analysis is completed. Data mining module 218 also receives the results of an analysis of a content item from client equipment 240, 241, or 242, and stores the results in data storage module 220. For example, content analyzer module 262 can send the result of the analysis of the content item to data analysis system 210, and data mining module 218 can store the result in data storage module 220.

Figure 3:
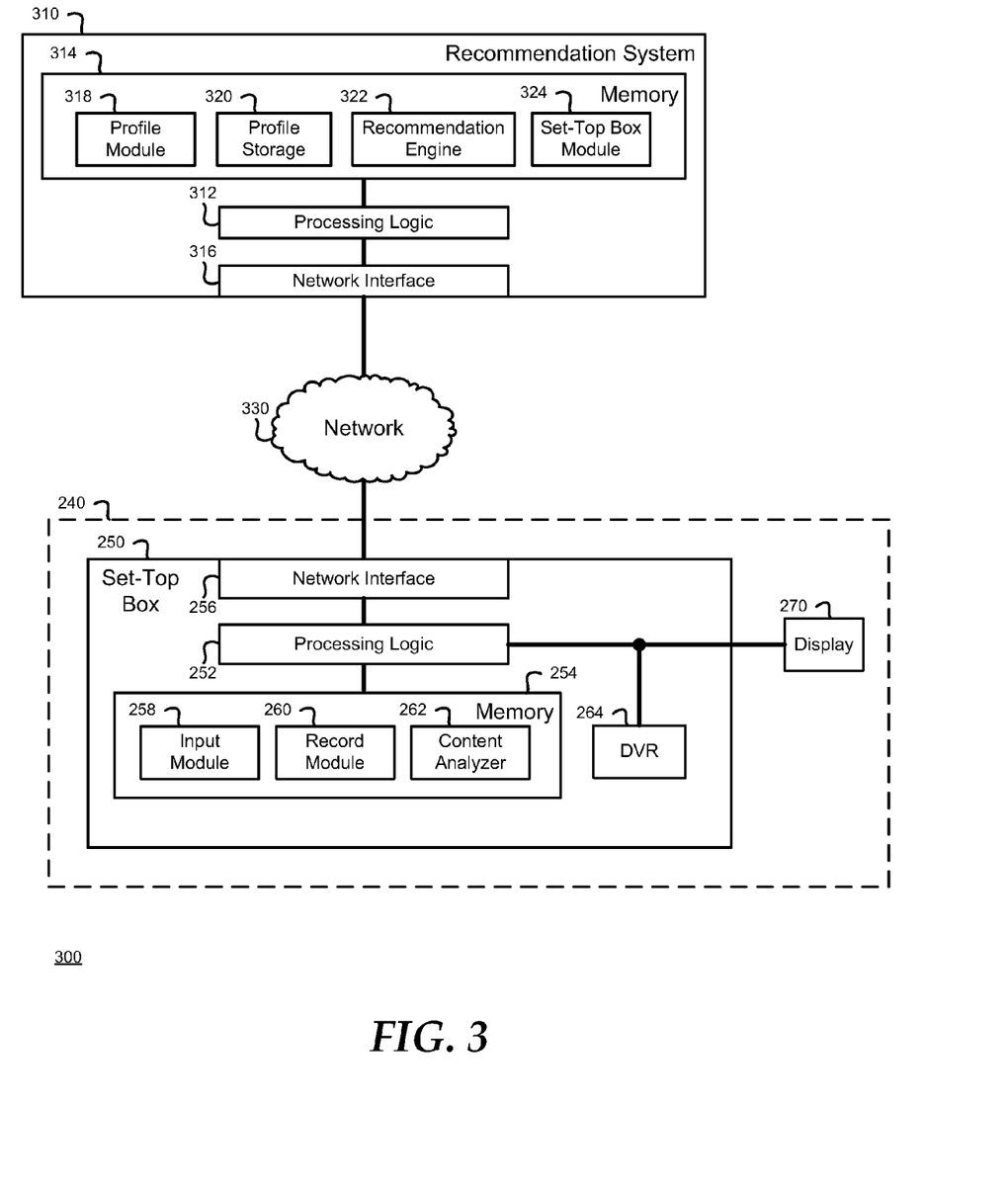
FIG. 3 is a block diagram of an embodiment of an IPTV network, similar to the IPTV network of FIG. 2, and including a recommendation system.
Figure 4:
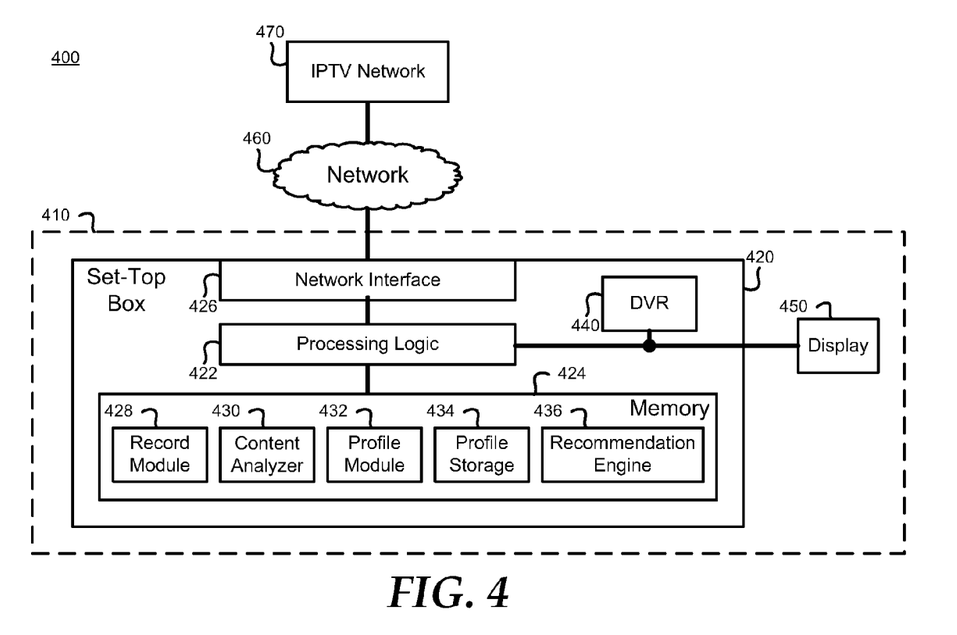
FIG. 4 is a block diagram of an embodiment of an IPTV network, similar to the IPTV network of FIG. 3, with a set-top box that includes a recommendation system.

FIGS. 3 and 4 illustrate other embodiments of IPTV systems in which a recommendation system provides recommendations related to a service. The recommendation system can select content to analyze and can direct a set-top box to analyze the content item in order to make recommendations based upon a wider range of content items. The set-top boxes can analyze a stream of the content in real time, or the content can be recorded using unused storage space on the set-top boxes' DVRs for later analysis. The results of the analysis can then be returned to the recommendation system. For example, a user may identify an interest in a particular music artist. The recommendation system can identify a large number of content items that relate to music, but that may lack a specific reference to the music artist in metadata information. The recommendation system can send the content items to the user's set-top box, and the set-top box can analyze the content items for references to the music artist. If a particular content item includes a reference to the music artist, the set-top box can identify the content item to the recommendation system, and the recommendation system can recommend the content item to the user. For example, the recommendation system may find no reference to the particular music artist in the metadata information describing a music news program, but can proactively analyze the music news program to determine if the particular music artist is mentioned. If the particular music artist is mentioned in the music news program, the recommendation system can record the music news program and recommend the music news program to the user.

FIG. 3 illustrates an exemplary embodiment of an IPTV system 300 similar to IPTV system 200 with a back-end recommendation system 310 that communicates with client equipment 240 via a network 330. Recommendation system 310 includes processing logic 312, a memory 314, and a network interface 316. Memory 314 is accessible to processing logic 312. Network interface 316 is adapted to facilitate communication between recommendation system 310 and network 330. Memory 314 includes a profile module 318, a profile storage module 320, a selector module such as a recommendation engine 322, and a set-top box module 324. Modules 318, 320, 322, and 324 can be implemented as computer instructions that are readable and executable by processing logic 312, as hardware logic, or as a combination thereof. Recommendation system 310 communicates with one or more sets of client equipment including client equipment 240. The client equipment can include devices of different types, and can communicate with different types of networks including the Internet, television access networks, such as cable, satellite and IPTV access networks, cellular networks, Wi-Fi networks, other wireless networks, or a combination thereof.

Profile module 318 determines to create a personalization profile for a subscriber to a service. For example, profile module 318 can create the personalization profile in response to a subscriber registering an account with a service provider, in response to the subscriber configuring preferences associated with the account via client equipment 240, in response to the subscriber's use of the service via client equipment 240, in response to a subscriber request to reset or otherwise alter a current profile, or in response to another event associated with the subscriber. The personalization profile is stored in profile storage module 320.

Further, profile module 318 receives an identification of an individual, such as another IPTV service subscriber, a celebrity, another real person or a fictional character. The identification can be received from client equipment 240 or from another network element communicating with the recommendation system, such as a web server that provides an online site associated with an online service to client equipment 240. Profile module 318 also retrieves a profile associated with the identified individual from profile storage module 320 or from an external source.

Also, profile module 318 creates a personalization profile associated with the subscriber and populates the personalization profile with information included in the profile of the identified individual. The information can include demographic information such as age, income, or location; personal interest information such as favorite channels or favorite programming; historical information such as purchasing history, television viewing history, or search history; other information; or any combination thereof. In one embodiment, profile module 318 provides a plurality of selectable identifications via a graphical user interface (GUI) at client equipment 240. For example, profile module 318 can receive a selection of one of the plurality of selectable identifications and create a personalization profile associated with the subscriber, where the created personalization profile is populated with information included in the profile of the identified individual.

In addition, profile module 318 updates the personalization profile based on at least one activity of the subscriber with respect to the service. For example, profile module 318 can update the personalization profile based on historical information related to subscriber activity with respect to the service. In another example, the personalization profile of an online retail service subscriber can be updated based on subscriber interaction with an online retail site via client equipment 240 or another subscriber device, such as a selection of a product, non-selection of a product, purchase of a product, non-purchase of a product, search query, or other subscriber activity.

Recommendation engine 322 provides one or more recommendations. For example, recommendation engine 322 can recommend video content items, music content items, one or more video channels, one or more music channels, other content items, or a combination thereof, to the subscriber when the subscriber activates set-top box 250, views an electronic program guide, selects a channel, purchases pay-per-view content items, purchases VOD content items, interacts with advertising content items, performs another action with respect to a television service, or a combination thereof. In another example, recommendation engine 322 can recommend one or more products when the subscriber visits an online retail site, views a product at the site, selects a product at the site, purchases a product at the site, searches for a product at the site, or any combination thereof.

Further, recommendation engine 322 generates an analysis request based on the personalization profile of the subscriber stored in profile storage module 320. Hence, at least one first recommendation can initially be based on information obtained from the profile of the identified individual, whereas at least one other recommendation can be based on an updated personalization profile of the subscriber. The recommendations can be sent to client equipment 240. Set-top box module 324 is similar to set-top box module 222, sending and receiving data from set-top box 250.

In the illustrated embodiment, recommendation module 322 selects a content item, and generates an analysis request to analyze the content item based on the information in the personalization profile of the subscriber. Further, recommendation engine 322 directs set-top box module 324 to initiate content analysis in client equipment 240. For example, set-top box module 324 can direct set-top box 250 to analyze a content item. Set-top box 250 can then perform a real time analysis on a stream of the content item, or record the content item on DVR 264 of later analysis, as described above.

Further, recommendation module 322 receives the results of an analysis of a content item from client equipment 240, and determines if the content item includes information that matches the personalization profile of the subscriber. If so, recommendation module 322 also recommends the content item to the subscriber, and modifies the personalization profile stored in profile storage module 320.

FIG. 4 illustrates another exemplary embodiment of an IPTV system 400 similar to IPTV system 300 with a recommendation system implemented at client equipment 410 to provide recommendation related to a service, and that communicates with an IPTV network 470 via a network 460. Client equipment 410 includes a set-top box 420, and a display device 450. Set-top box 420 includes processing logic 422, a memory 424, a network interface 426, and a DVR 440. Memory 424 is accessible to processing logic 422. Network interface 426 is adapted to facilitate communication between client equipment 410 and network 460. Memory 424 includes a record module 428, a content analyzer module 430, a profile module 432, a profile storage module 434, and a selector module such as a recommendation engine 436. Modules 428, 430, 432, 434, and 436 can be implemented as computer instructions that are readable and executable by processing logic 422, as hardware logic, or as a combination thereof.

Record module 428 records content items on DVR 440 or instructs an external DVR (not illustrated) to record the content items. In another example, record module 428 can send the content items from DVR 440 to display device 450. Content analyzer module 430 analyzes content items received by set-top box 420.

Profile module 432 determines to create a personalization profile for a subscriber to a service. The personalization profile is stored in profile storage module 434. Profile module 432 also receives an identification of an individual, and retrieves a profile associated with the identified individual from profile storage module 434. Further, profile module 432 creates or updates a personalization profile associated with the subscriber and populates the personalization profile with information included in the profile of the identified individual. Recommendation engine 436 provides one or more recommendations. Recommendation engine 436 also generates the recommendation(s) based on the personalization profile of the subscriber stored in profile storage module 434.

In the illustrated embodiment, recommendation module 436 selects a content time and generates an analysis request to analyze the content item based on the information in the personalization profile of the subscriber. Further, recommendation engine 436 initiates content analysis in set-top box 420. For example, set-top box 420 can perform a real time analysis on a stream of the content item, or record the content item on DVR 440 of later analysis. Recommendation module 436 also receives the results of an analysis of a content item, and determines if the content item includes information that matches the personalization profile of the subscriber. If so, recommendation module 436 recommends the content item to the subscriber, and modifies the personalization profile stored in profile storage module 432.

Figure 5:
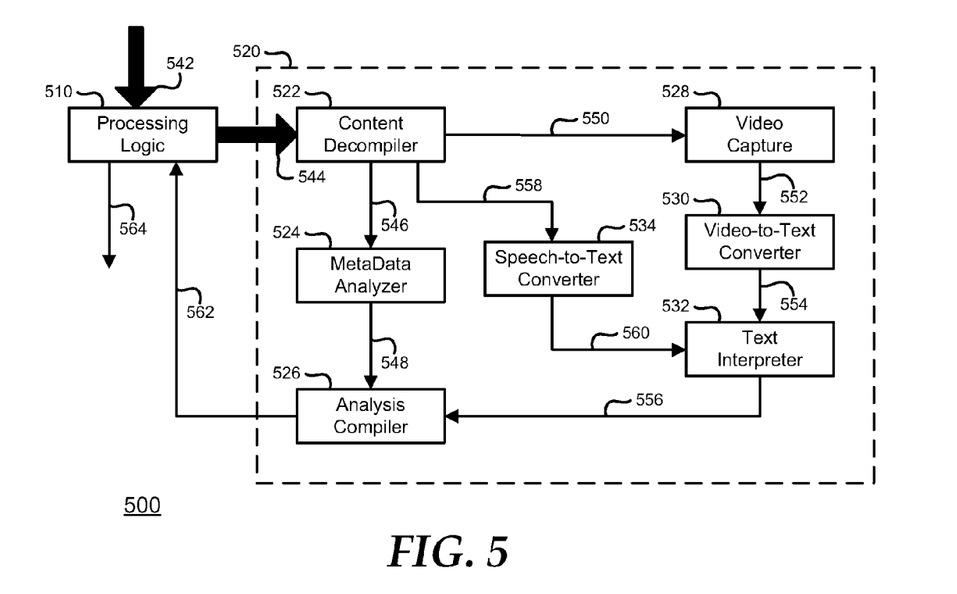
FIG. 5 is a block diagram of an embodiment of a content analysis system.

FIG. 5 illustrates an exemplary embodiment of a content analysis system 500, including processing logic 510 and a content analyzer 520 similar to content analyzer module 262. Content analyzer 520 includes a content decompiler module 522, a metadata analyzer module 524, an analysis compiler module 526, a video capture module 528, a video-to-text converter module 530, a text interpreter module 532, and a speech-to-text converter module 534. Content analyzer 520 is accessible to processing logic 510. Modules 522, 524, 526, 528, 530, 532, and 534 can be implemented as computer instructions that are readable and executable by processing logic 510, as hardware logic, or as a combination thereof.

Content decompiler module 522 receives a content item signal 544 from processing logic 510, separates metadata information in content item signal 544 into a metadata signal 546, and separates content information in content item signal 544 into a video signal 550, and an audio signal 558. For example, processing logic 510 can receive a content item signal 542 from a data analysis system, a recommendation system, a DVR, another content signal source, or a combination thereof. In a further example, content decompiler module 522 can receive content item signal 544 and separate metadata signal 546 from video signal 550 and from audio signal 558. Content decompiler module 522 also sends the separated metadata signal 546, video signal 550, and audio signal 558 to separate metadata analysis, video analysis, and audio analysis paths, as described below. The metadata analysis path includes metadata analyzer module 524 and analysis compiler 528. The video analysis path includes screen capture module 528, screen-to-text converter module 530, text interpreter module 532 and analysis compiler 528. The audio analysis path includes speech-to-text converter 534, text interpreter module 532 and analysis compiler 528.

Metadata analyzer module 524 receives metadata signal 546 from content decompiler 522 and analyzes the metadata information contained in metadata signal 546. For example, metadata analyzer module 524 can perform a variety of analysis functions on metadata signal 546, including, for example, analyzing metadata signal 546 for a search term or indexing criteria provided by a data analysis system, analyzing for a selection of identifications from a personalization profile in a recommendation system, analyzing according to another method of analysis, or a combination thereof. Further, metadata analyzer module 524 sends a result 548 from the various types of analysis done by metadata analyzer module 524 to analysis compiler 528.

Screen capture module 528 receives video signal 550 from content decompiler 522, and generates a screen capture 552 of video signal 550. For example, screen capture module 528 can receive video signal 550 associated with content item signal 544 and capture a screenshot of the video signal. In particular, for example, the frame can include closed captioning text that is running concurrently with the visual information displayed in the content item, credits information that is displayed as part of content item signal 544, other visual information, or a combination thereof. Further, screen capture module 528 sends screen capture 552 to screen-to-text converter module 530.

Screen-to-text converter module 530 receives screen capture 552 from screen capture module 528, evaluates screen capture 552 to determine if any text information is included in the visual information, and converts any text information from the visual information into a text readout 554. For example, screen-to-text converter module 530 can receive screen capture 552 from content item signal 544. Further, screen-to-text converter module 530 can determine that screen capture 552 does not include closed captioning text, credits text, other text, or a combination thereof, and can then evaluate a next screen capture. Alternately, screen-to-text converter module 530 can determine that screen capture 552 includes closed captioning text, credits text, other text, or a combination thereof, and can then convert the text information into text readout 554. Screen-to-text converter module 530 also sends text readout 554 to text interpreter module 532.

Speech-to-text converter module 534 receives audio signal 558 from content decompiler 522, evaluates the audio signal to determine if any spoken information is included in the audio information, and converts any spoken information from the audio information into a text readout 560. For example, speech-to-text converter module 534 can receive audio signal 558 from content item signal 544. Further, speech-to-text converter module 534 can determine that audio signal 558 includes spoken information, and can then convert the spoken information into text readout 560. Speech-to-text converter module 534 also sends text readout 560 to text interpreter module 532.

Text interpreter module 532 receives the text readout 554 from screen-to-text converter 530 and text readout 560 from speech-to-text converter 534. Further, text interpreter module 532 analyzes text readouts 554 and 560. For example, text interpreter module 532 can perform a variety of analysis functions on text readouts 554 and 560, including, for example, analyzing for a search term or indexing criteria provided by a data analysis system, analyzing for a selection of identifications from a personalization profile in a recommendation system, analyzing according to another method of analysis, or a combination thereof. Text interpreter module 532 also sends a result 556 from the various types of analysis done by text interpreter module 532 to analysis compiler 528.

Analysis compiler module 526 receives result 548 from metadata analyzer module 524 and receives result 556 from text interpreter module 532. Further, analysis compiler module 526 combines results 548 and 556 into an analyzer output 562. For example, analysis compiler module 526 can organize results 548 and 556 into a list, a table, a catalog, another organization structure, or a combination thereof. Analysis compiler module 526 also sends analyzer output 562 to processing logic 510. Processing logic 510 operates to receive analyzer output 562, and to output an analysis 564. For example, analysis 564 can be sent to a data analysis system, a recommendation system, a DVR, another consumer of analysis 564, or a combination thereof.

Figure 6:
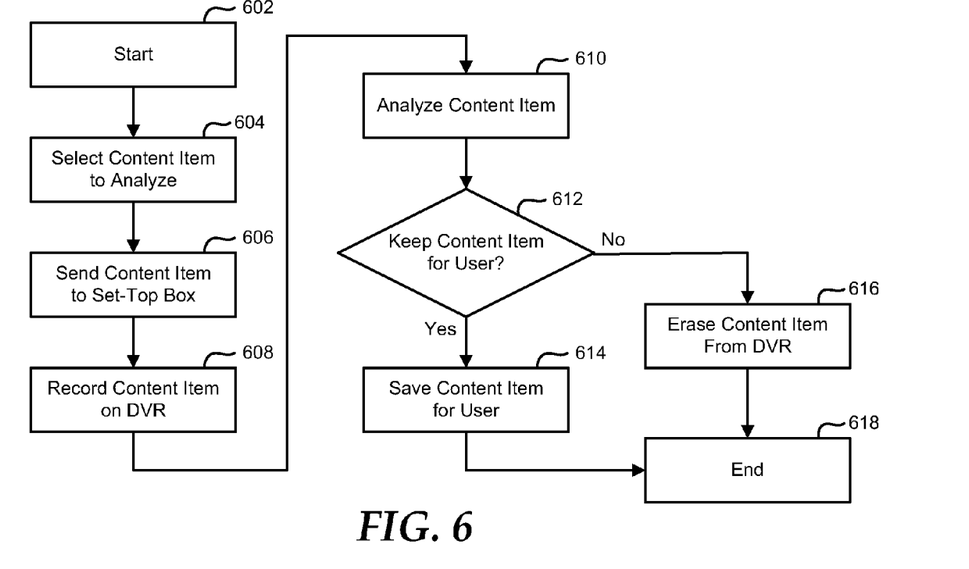
FIG. 6 is a flowchart illustrating a method of using a content analysis system.

FIG. 6 is a flowchart illustrating an embodiment of a method of proactively recording to a DVR for data analysis. The method starts in block 602, and a content item is selected for analysis in block 604. For example, data analysis system 210 can select a particular content item for analysis for data analysis purposes. In another example, recommendation system 310 or recommendation engine 436 can select a particular content item for analysis for potential inclusion in the personalization profile. The content item is sent to a set-top box in block 606. For example, data analysis system 210, having determined that client equipment 240 is available to perform an analysis, can send the particular content item to set-top box 250 for analysis. In another example, recommendation system 310 can send the particular content item to set-top box 250, or recommendation engine 436 can have IPTV network 470 sent the particular content item to set-top box 420. In an optional step of the method, the content is recorded on a DVR associated with the set-top box in block 608. For example, the particular content item can be recorded to DVR 264, DVR 440, or to an externally attached DVR.

The content item is analyzed in block 610. In a particular embodiment, where the optional step of block 608 is omitted, a stream of the content item is analyzed in real time. In another embodiment, where the optional step of block 608 is performed, a stream of the content item can be analyzed in real time, the content item can be analyzed in a post-recording operation, or a combination thereof. For example, whether the analysis is real time, post-recording, or a combination, content analyzer 262 or 430 can perform an analysis of the particular content item. In a further example, content analyzers 262 and 430 can analyze metadata information, an audio track, or a video track for pertinent information.

A decision is made as to whether or not to keep the content item for a user to view in decision block 612. If so, the "YES" branch of decision block 612 is taken, the content item is saved for the user in block 614, and the method ends in block 618. For example, recommendation system 310 or recommendation engine 436 can determine that the particular content item might be of interest to the user based upon the user's personalization profile and the results of the analysis, and can determine to save the particular content item. In this case, where the optional step of block 608 is omitted, recommendation system 310 or recommendation engine 436 can record the particular content item on DVR 264 or DVR 440. Otherwise, where the optional step of block 608 is performed, recommendation system 310 or recommendation engine 436 can leave the content item as recorded on DVR 264 or DVR 440. If a decision is made as to not keep the content item for a user to view, the "NO" branch of decision block 612 is taken, and where the optional step of block 608 is omitted, then the method ends in block 618. Otherwise, where the optional step of block 608 is performed, the content item is erased from the DVR in block 616, and the method ends in block 618.

Figure 7:
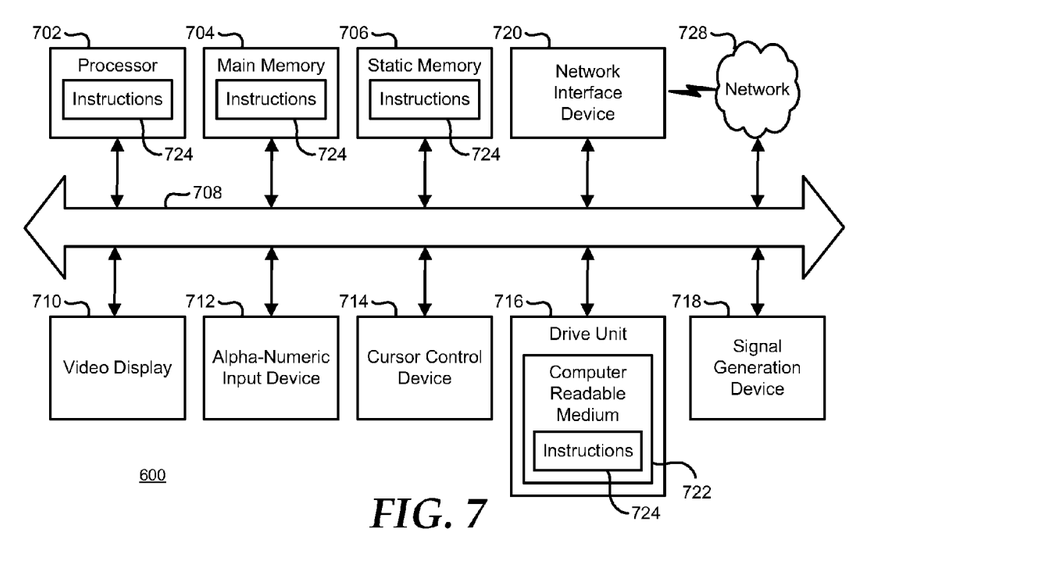
FIG. 7 is a block diagram showing an illustrative embodiment of a general computer system.

FIG. 7 shows an illustrative embodiment of a general computer system 700 in accordance with at least one embodiment of the present disclosure. Computer system 700 includes a set of instructions that can be executed to cause computer system 700 to perform any one or more of the methods or computer based functions disclosed herein. Computer system 700 can operate as a standalone device or can be connected via a network to other computer systems or peripheral devices.

In a networked deployment, computer system 700 operates in the capacity of a server or as a client computer in a server-client network environment, or as a peer computer system in a peer-to-peer (or distributed) network environment. Computer system 700 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 700 is implemented using electronic devices that provide voice, video or data communication. Further, while computer system 700 is illustrated as a single system, the term "system" shall also be taken to include any collection of systems or sub-systems that individually or jointly execute a set, or multiple sets, of instructions to perform one or more computer functions.

Computer system 700 includes a processor 702 such as a central processing unit (CPU), a graphics processing unit (GPU), or both. Moreover, computer system 700 includes a main memory 704 and a static memory 706 that communicate with each other via a bus 708. Computer system 700 further includes a video display unit 710, such as a liquid crystal display (LCD), an organic light emitting diode (OLED), a flat panel display, a solid state display, or a cathode ray tube (CRT). Additionally, computer system 700 includes an input device 712, such as a keyboard, and a cursor control device 714, such as a mouse. Computer system 700 also includes a disk drive unit 716, a signal generation device 718, such as a speaker or remote control, and a network interface device 720.

In a particular embodiment, disk drive unit 716 includes a computer-readable medium 722 in which one or more sets of instructions 724 are embedded. Instructions 724 embody one or more of the methods or logic as described herein. In a particular embodiment, instructions 724 reside completely, or at least partially, within main memory 704, static memory 706, and/or within processor 702 during execution by computer system 700. Main memory 704 and processor 702 also include computer-readable media. Network interface device 720 provides connectivity to a network 726 such as a wide area network (WAN), a local area network (LAN), or other network. The present disclosure contemplates a computer-readable medium that includes instructions 724 or receives and executes instructions 724 responsive to a propagated signal, so that a device connected to network 726 can communicate voice, video or data over network 726. Further, instructions 724 can be transmitted or received by network 726 via network interface device 720.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A server device of an Internet Protocol television system, comprising:
    a memory to store instructions; and
    a processor coupled to the memory, wherein the processor, responsive to executing the instructions, performs operations comprising:
        selecting a content item;
        sending the content item that is selected to a set-top box; and
        directing the set-top box to perform operations comprising:
            recording the content item on the set-top box as a recorded content item;
            determining first information based on a personalization profile of a subscriber, wherein the first information comprises subjects of interest for the subscriber;
            determining that metadata of the content item does not match the first information;
            responsive to determining that the content item does not match the first information:
                analyzing content information associated with the recorded content item using a speech interpretation algorithm to create an index of the content information;
                determining, based on the index, whether the content information matches the first information;
                recommending the recorded content item to the subscriber if the content information matches the first information of the personalization profile; and
                deleting the recorded content item if the content information does not match the first information of the personalization profile.

2. The server of claim 1, wherein analyzing the content information further comprises using a text interpretation algorithm that is adapted to analyze a closed captioning track of the recorded content item.

3. The server of claim 2, wherein the text interpretation algorithm is further adapted to analyze the closed captioning track using a screen-to-text algorithm.

4. The server of claim 1, wherein the processor further performs operations comprising modifying the personalization profile responsive to recommending the recorded content item.

5. The server of claim 1, wherein the speech interpretation algorithm is adapted to analyze an audio track of the recorded content item.

6. The server of claim 5, wherein the speech interpretation algorithm is further adapted to analyze the audio track using a speech-to-text algorithm.

7. The server of claim 6, wherein the speech interpretation algorithm is adapted to determine that a search term is included in the audio track.

8. A set-top box, comprising:
    a memory to store instructions; and
    a processor coupled to the memory, wherein the processor, responsive to executing the instructions, performs operations comprising:
        recording a content item from an interactive television network;
        determining first information based on a personalization profile of a subscriber,
    wherein the first information comprises subjects of interest for the subscriber;
        determining that metadata of the content item does not match the first information;
        responsive to determining that the content item does not match the first information:
            analyzing content information associated with the recorded content item using a text interpretation algorithm to create an index of the content information;
            determining, based on the index, whether the content information matches the first information;
            recommending the recorded content item to the subscriber if the content information matches the first information of the personalization profile; and
            deleting the recorded content item if the content information does not match the first information of the personalization profile.

9. The set-top box of claim 8, wherein the text interpretation algorithm is adapted to analyze a closed captioning track of the recorded content item.

10. The set-top box of claim 9, wherein the text interpretation algorithm is further adapted to analyze the closed captioning track using a screen-to-text algorithm.

11. The set-top box of claim 10, wherein the text interpretation algorithm is adapted to determine that a search term is included in the closed captioning track.

12. The set-top box of claim 8, wherein analyzing the content information further comprises using a speech interpretation algorithm that is adapted to analyze an audio track of the recorded content item.

13. The set-top box of claim 12, wherein the speech interpretation algorithm is further adapted to analyze the audio track using a speech-to-text algorithm.

14. The set-top box of claim 13, wherein the speech interpretation algorithm is adapted to determine that a search term is included in the audio track.

15. A method, comprising:
    sending, by a system comprising a processor, a content item to a set-top box;
    directing, by the system, the set-top box to record the content item as a recorded content item;
    determining, by the system, first information based on a personalization profile of a subscriber, wherein the first information comprises subjects of interest for the subscriber;
    determining, by the system, that metadata of the content item does not match the first information;
    responsive to determining that the content item does not match the first information:
    directing, by the system, the set-top box to analyze content information associated with the recorded content item as an analysis of the content information;
    directing, by the system, the set-top box to determine based on the analysis of the content information whether the content information associated with the recorded content item matches the first information;
    directing, by the system, the set-top box to recommend the recorded content item to the subscriber if the content information matches the first information of the personalization profile; and
    directing, by the system, the set-top box to delete the recorded content item if the content information does not match the first information of the personalization profile.

16. The method of claim 15, wherein the analysis of the content information comprises an analysis of a closed captioning track of the recorded content item.

17. The method of claim 16, wherein the analysis of the closed captioning track comprises a screen-to-text algorithm.

18. The method of claim 15, wherein the analysis of the content information comprises determining that a search term is included in a closed captioning track of the recorded content item.

19. The method of claim 15, wherein the analysis of the content information comprises analysis of an audio track of the recorded content item.

20. The method of claim 19, wherein the analysis of the audio track comprises a speech-to-text algorithm.

* * * * *